(12) United States Patent
Gingrich et al.

(10) Patent No.: US 8,893,687 B2
(45) Date of Patent: Nov. 25, 2014

(54) FUEL INJECTION STRATEGY FOR INTERNAL COMBUSTION ENGINE HAVING DEDICATED EGR CYLINDERS

(75) Inventors: Jess W. Gingrich, San Antonio, TX (US); Terrence F. Alger, II, San Antonio, TX (US); Raphael Gukelberger, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 299 days.

(21) Appl. No.: 13/405,253

(22) Filed: Feb. 25, 2012

(65) Prior Publication Data

US 2013/0220286 A1 Aug. 29, 2013

(51) Int. Cl.
*F02B 47/08* (2006.01)
*F02M 25/07* (2006.01)

(52) U.S. Cl.
USPC ............ 123/568.11; 123/315; 123/58.8; 60/278; 701/103; 701/105; 701/108

(58) Field of Classification Search
USPC ............ 123/568.11, 58.8, 315, 568.17; 701/103, 105, 108; 60/280, 288, 605.1, 60/605.2
See application file for complete search history.

(56) References Cited

U.S. PATENT DOCUMENTS

| | | | |
|---|---|---|---|
| 6,286,489 B1 | 9/2001 | Bailey | |
| 6,742,507 B2 | 6/2004 | Keefer | |
| 6,877,492 B1 | 4/2005 | Osterwald | |
| 7,721,541 B2 | 5/2010 | Roberts, Jr. | |
| 7,739,999 B2* | 6/2010 | Kang et al. | 123/299 |
| 8,069,657 B2* | 12/2011 | Gray, Jr. | 60/295 |
| 8,291,891 B2* | 10/2012 | Alger et al. | 123/568.11 |
| 2007/0151232 A1* | 7/2007 | Dalla Betta et al. | 60/286 |
| 2008/0110161 A1* | 5/2008 | Persson | 60/312 |
| 2009/0308070 A1 | 12/2009 | Alger, II | |
| 2010/0191444 A1* | 7/2010 | Aoki | 701/109 |
| 2011/0271657 A1* | 11/2011 | Tan et al. | 60/274 |
| 2012/0144801 A1* | 6/2012 | Levijoki et al. | 60/274 |
| 2012/0191325 A1* | 7/2012 | Haskara et al. | 701/104 |
| 2012/0323470 A1* | 12/2012 | Klingbeil et al. | 701/108 |
| 2012/0330534 A1* | 12/2012 | Cleeves et al. | 701/104 |
| 2013/0008416 A1* | 1/2013 | Nagatsu et al. | 123/568.11 |
| 2013/0133632 A1* | 5/2013 | Sano et al. | 123/568.11 |

* cited by examiner

*Primary Examiner* — Stephen K Cronin
*Assistant Examiner* — Joseph Dallo
(74) *Attorney, Agent, or Firm* — Chowhury & Georgakis, P.C.; Ann C. Livingston

(57) ABSTRACT

A method using exhaust gas recirculation (EGR) in an internal combustion engine. The engine has at least one "dedicated EGR cylinder", whose entire exhaust is recirculated back to all the engine cylinders. The dedicated EGR cylinder is operated at a rich air-fuel ratio, and the other cylinders are operated stoichiometrically so that a conventional three way catalyst may be used to treat the exhaust. A fuel injector is used to inject fuel into the combustion chamber of the dedicated EGR cylinder after initiation of the main combustion event. This post injection method overcomes flammability limits of a dedicated EGR cylinder, and increases the hydrogen (H2) and carbon monoxide (CO) in its exhaust.

12 Claims, 5 Drawing Sheets

FUEL INJECTION STRATEGY FOR INTERNAL COMBUSTION ENGINE HAVING DEDICATED EGR CYLINDERS

TECHNICAL FIELD OF THE INVENTION

This invention relates to internal combustion engines, and more particularly to an improved exhaust gas recirculation system for such engines.

BACKGROUND OF THE INVENTION

For many internal combustion engines, their engine control strategy has three important parameters: spark timing (or fuel injection timing in a diesel engine), the exhaust gas recirculation (EGR) rate and the air/fuel ratio (AFR).

To implement EGR, a fraction of the exhaust gas is recycled from the exhaust system back to the intake system. The recirculated exhaust gas is mixed with the fresh fuel-air mixture before entering the cylinders. EGR can be implemented in internal and external configurations. External configurations can be implemented as either a high pressure or low pressure loop, depending on whether the recirculated exhaust is introduced to the intake post compressor (high pressure loop) or pre-compressor (low pressure loop).

EGR has a long history of use in both diesel and spark-ignited engines for reduction of NOx emissions. It affects combustion in several ways. The combustion is cooled by the presence of exhaust gas, that is, the recirculated exhaust gas absorbs heat. The dilution of the oxygen present in the combustion chamber reduces the production of NOx. Also, if exhaust gas is being recirculated, less air is breathed by the engine, so reducing the amount of exhaust gas produced.

As a relatively simple and low cost technology, EGR can be expected to be widely used on all types of engines. Of particular interest is that EGR can reduce the need for fuel enrichment at high loads in turbocharged engines and thereby improve fuel economy.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to a fuel injection method for use with an internal combustion engine having dedicated EGR. In a "dedicated EGR" engine, one or more of the engine's cylinders is used to generate exhaust gas to be recirculated and used as a diluent for the intake charge of the entire engine. The entire exhaust gas output of the dedicated EGR cylinder is recirculated, typically back to all cylinders. None of the exhaust of the non-dedicated EGR cylinders is recirculated.

A feature of dedicated EGR is that the composition of the exhaust gas from the dedicated cylinder(s) is controlled to be different from that of the exhaust of the non-dedicated cylinders. Specifically, the EGR composition is changed to improve combustion on all cylinders as compared to EGR in non dedicated EGR systems. U.S. patent application Ser. No. 12/140,878, entitled "EGR System with Dedicated EGR Cylinders", to Alger, et al, discusses dedicated EGR and is incorporated by reference herein.

Figure 1:
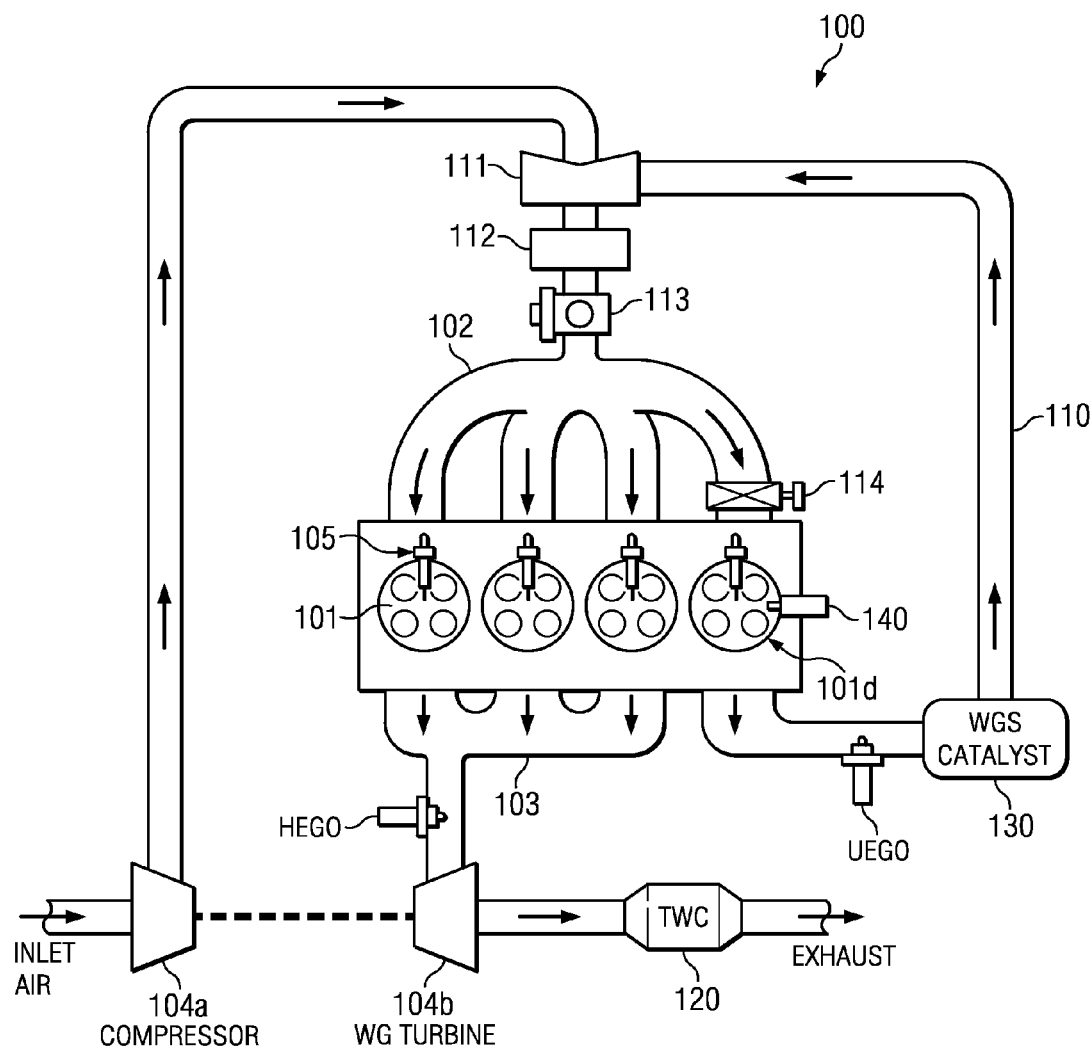
FIG. 1 illustrates an example of an internal combustion engine having one dedicated EGR cylinder.

FIG. 1 illustrates an internal combustion engine 100 having four cylinders 101. One of the cylinders is a dedicated EGR cylinder, and is identified as cylinder 101d.

In the example of this description, engine 100 is spark ignited, and each cylinder 101 has an associated spark plug 105. However, the methods described herein are also suitable for use with compression ignited engines. The engine's non-dedicated EGR cylinders 101 can be operated with a lean burn or stoichiometric air-fuel ratio. In the example of this description, the non-dedicated EGR cylinders are assumed to run stoichiometrically, allowing the use of a three way catalyst 120.

The dedicated-EGR cylinder 101d is run rich. All of its exhaust is recirculated back to the intake manifold 102. The exhaust of the other three cylinders 101 (referred to herein as the "main" or "non dedicated" cylinders) is directed to an exhaust system via an exhaust manifold 103. In this example, the engine is said to have "25% dedicated EGR" because one of its four cylinders has all of its exhaust redirected to the intake manifold 102.

Engine 100 is equipped with a turbocharger, specifically a compressor 104a and a turbine 104b. Although not explicitly shown, the cylinders have some sort of means for introducing fuel into the cylinders, such as fuel injectors. The main fuel delivery system can be fumigated, port injected, or direct injected.

The dedicated EGR cylinder 101d is equipped with a direct injection fuel injector 140. This fuel injector 140 may be the main means of fuel introduction, or may be a special supplemental fuel injector for implementing the method described herein. As explained below, to implement the method, additional fuel is injected into the combustion chamber of dedicated EGR cylinder 101d after the majority of combustion has occurred. This process of injecting additional fuel is referred to herein as "post injection", and increases the H2 (hydrogen) and CO (carbon monoxide) concentrations in the exhaust gas exiting the dedicated EGR cylinder.

The exhaust from the dedicated EGR cylinder 101d is recirculated via an EGR line 110. A water gas shift (WGS) catalyst 130, optionally placed along the EGR line 110, is discussed in further detail below. As explained below, WGS catalyst 130 converts additional CO (produced by the post injection) to H2.

The EGR line 110 joins the intake line at a mixer 111. The mixture of recirculated exhaust and fresh air is cooled with a cooler 112. A throttle 113 is used to control the amount of intake into the intake manifold 102.

An EGR valve 114 may be used to control the intake into the EGR cylinder 101d. In other embodiments, variable valve timing may be used to control EGR flow.

In other embodiments, there may be a different number of engine cylinders 101, and/or there may be more than one dedicated EGR cylinder 101*d*. In general, in a dedicated EGR engine configuration, the exhaust of a sub-group of cylinders is routed back to the intake of all the cylinders, thereby providing EGR for all cylinders.

The dedicated EGR cylinder(s) can operate at any equivalence ratio because its exhaust will not exit the engine before passing through a non-dedicated EGR cylinder 101 operating at a stoichiometric air-fuel ratio.

In the embodiment of FIG. 1, because only stoichiometric exhaust leaves the engine, a conventional three way catalyst (TWC) 120 can be used to reduce pollutant emission. In embodiments in which the engine system is a lean burn system, the exhaust from the non dedicated ("main") EGR cylinders will pass through an appropriate exhaust aftertreatment device, such as a lean NOx trap, NOx adsorber or selective reduction catalyst.

Figure 2:
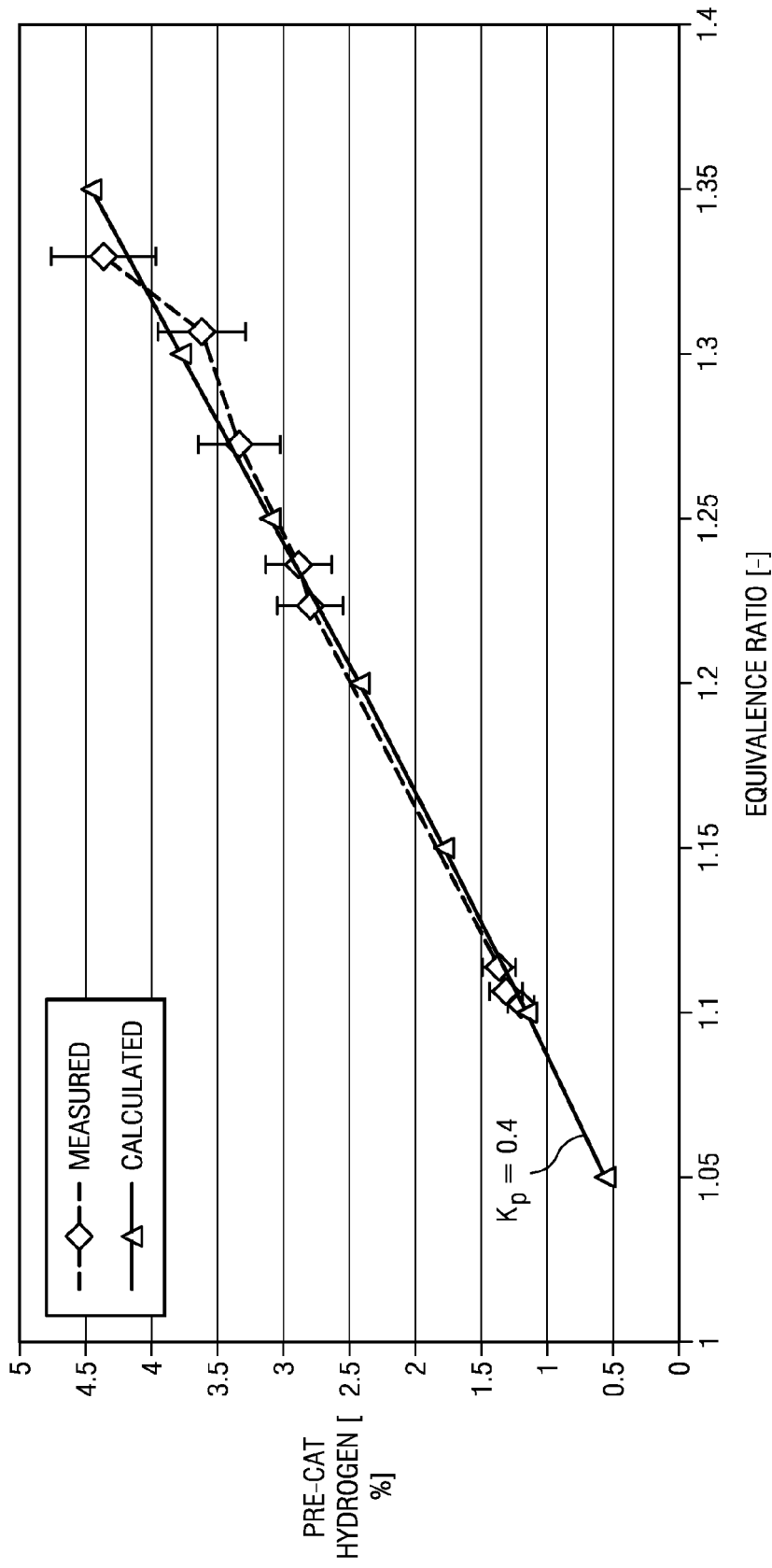
FIG. 2 illustrates the H2 (hydrogen) concentration of exhaust from the dedicated EGR cylinder as a function of the equivalence ratio of air and fuel provided to the cylinder.

FIG. 2 illustrates measured and calculated H2 concentrations in untreated exhaust gas as a function of the engine equivalence ratio. As illustrated, the H2 concentration increases with an increased equivalence ratio (amount of fuel enrichment). If the dedicated EGR cylinder 101*d* is run rich, it produces more hydrogen (H2) and carbon monoxide (CO). This in turn, enhances the flame speeds, combustion, and knock tolerance of all cylinders.

The method described herein is a post fuel injection strategy that further increases the exhaust's H2 and CO content without loss of stable engine operation. The motivation behind the method is to establish a technique to increase the amount of H2 and CO produced by a dedicated EGR cylinder beyond the flammability limits when conventional EGR methods are used.

In the absence of this method, in a spark-ignited dedicated EGR engine, the maximum H2 concentration in the exhaust from a dedicated EGR cylinder is limited to approximately 4% per volume. This is due to combustion instabilities at greater equivalence ratios. The method allows a dedicated EGR cylinder to produce even more H2 and CO than would normally be achievable with only rich combustion and no post injection.

Referring again to FIG. 1, the dedicated EGR cylinder 101*d* is equipped with a direct injection fuel injector 140. Fuel is injected into the combustion chamber of that cylinder after the majority of combustion has occurred. This increases the H2 and CO concentration exiting cylinder 101*d* beyond what is typically capable.

The EGR from the dedicated EGR cylinder 101*d* is "higher quality EGR" in the sense that its composition positively impacts combustion. Specifically, it will improve knock tolerance, combustion efficiency, and minimize ignition energy requirements beyond what is capable from rich combustion alone. This further improves overall engine efficiency without compromising the effectiveness of a three way catalyst 120 in the exhaust after-treatment system.

The direct fuel injection delivered by injector 140 delivers raw fuel into the combustion chamber at times in the combustion cycle where the fuel is partially converted to CO and H2. This direct injection strategy can be used with a combination of fuels (liquid or gaseous), or a single fuel source. Fuels having a high HC (hydrocarbon) ratio may be used to encourage more H2 production per mole of fuel.

The "post injection" of fuel into the combustion chamber of the dedicated EGR cylinder 101*d* increases the H2 and CO concentration in its exhaust beyond what can be accomplished by running the cylinder at a rich air-fuel ratio (AFR). The post injection delivers fuel to the hot combustion chamber and increases the products of partial combustion ($H_2$ and CO) by circumventing the rich flammability limit of the primary cylinder charge. The exhaust of the dedicated EGR cylinder is fully rerouted to the intake manifold 102, and is consumed by the non-EGR cylinders 101, whose exhaust is treated by three way catalyst 120.

Post injection of fuel, which occurs after combustion has been initiated, may last as long at the cylinder temperatures are high enough to promote the hydrocarbon fuel reaction toward $H_2$ and/or CO. By doing so, the EGR quality (defined as the ability of EGR to positively impact combustion) increases, and thereby inhibits knock, increases flame speed, and improves performance of the engine as a whole.

Using post injection, more fuel may be delivered to the combustion chamber of the dedicated EGR cylinder while still operating within its flammability limits. In addition to permitting more fuel, the method includes optimizing the balance of fuel between the main introduction of fuel (used for the main combustion event) and the post injection (used to create additional partial product of combustion) to manipulate the quality of the EGR produced by the dedicated EGR cylinder.

Referring again to FIG. 1, the use of WGS catalyst 130 along the EGR line 110 further increases the amount of H2 in the EGR exhaust through the water-gas-shift (WGS) reaction. The water gas shift reaction may be expressed as follows:

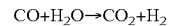

$$CO + H_2O \rightarrow CO_2 + H_2$$

Figure 3:
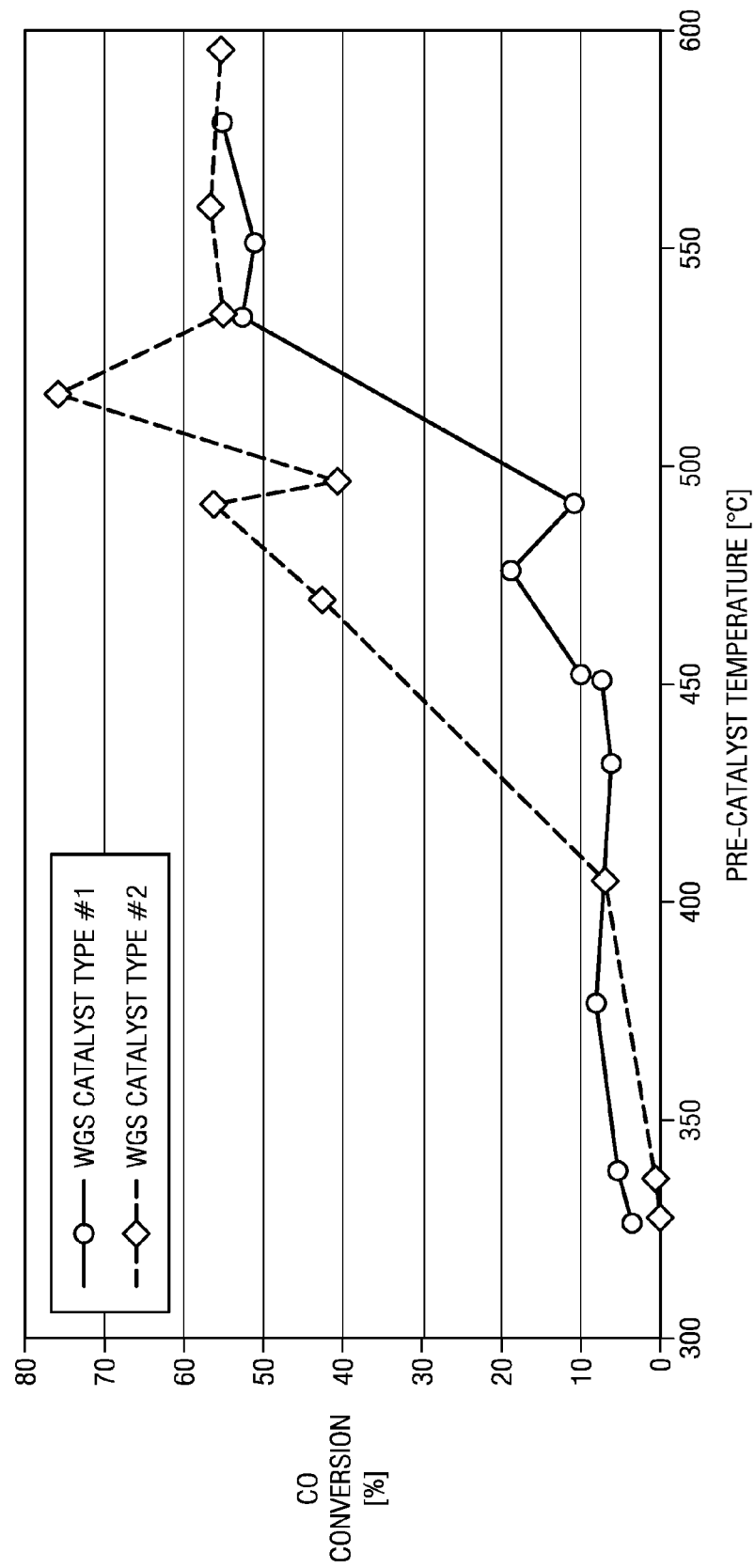
FIG. 3 illustrates the CO (carbon monoxide) conversion efficiency of the water-gas shift (WGS) catalyst of FIG. 1, as a function of exhaust gas temperature entering the catalyst.

FIG. 3 illustrates the CO conversion efficiency of a WGS catalyst, such as WGS catalyst 130, as a function of pre-catalyst exhaust temperature. Plots for two different WGS catalyst types are shown. As illustrated, the conversion performance of the WGS catalyst is highly dependent on the temperature of the exhaust gas entering the catalyst.

The amount of H2 exiting the WGS catalyst is dependent on both the amount entering and the amount created. The amount entering the catalyst is a function of the air-fuel ratio of the dedicated EGR cylinder(s), spark timing and the amount of total EGR. The amount created is dependent on exhaust gas temperature and the amount of CO in the inlet exhaust. With regard to the amount of CO at the inlet of the WGS catalyst 130, the amount of CO entering a WGS catalyst can be manipulated by manipulating the air-fuel ratio. Thus, for a given operating condition, the air-fuel ratio of the dedicated EGR cylinder can be controlled to maximize the amount of H2 exiting WGS catalyst 130.

It is expected that the AFR range of the dedicated EGR cylinder 101*d*, operating on gasoline, will range from approximately a 0.7 equivalence ratio (−30% lean) to −1.6 (60% rich). The upper limit is due to fundamental flammability limits of a gasoline-air mixture. With post injection, the amount of fuel injected is not limited—the heat in the combustion chamber will facilitate dissociation of gasoline to H2 and CO.

Figure 4:
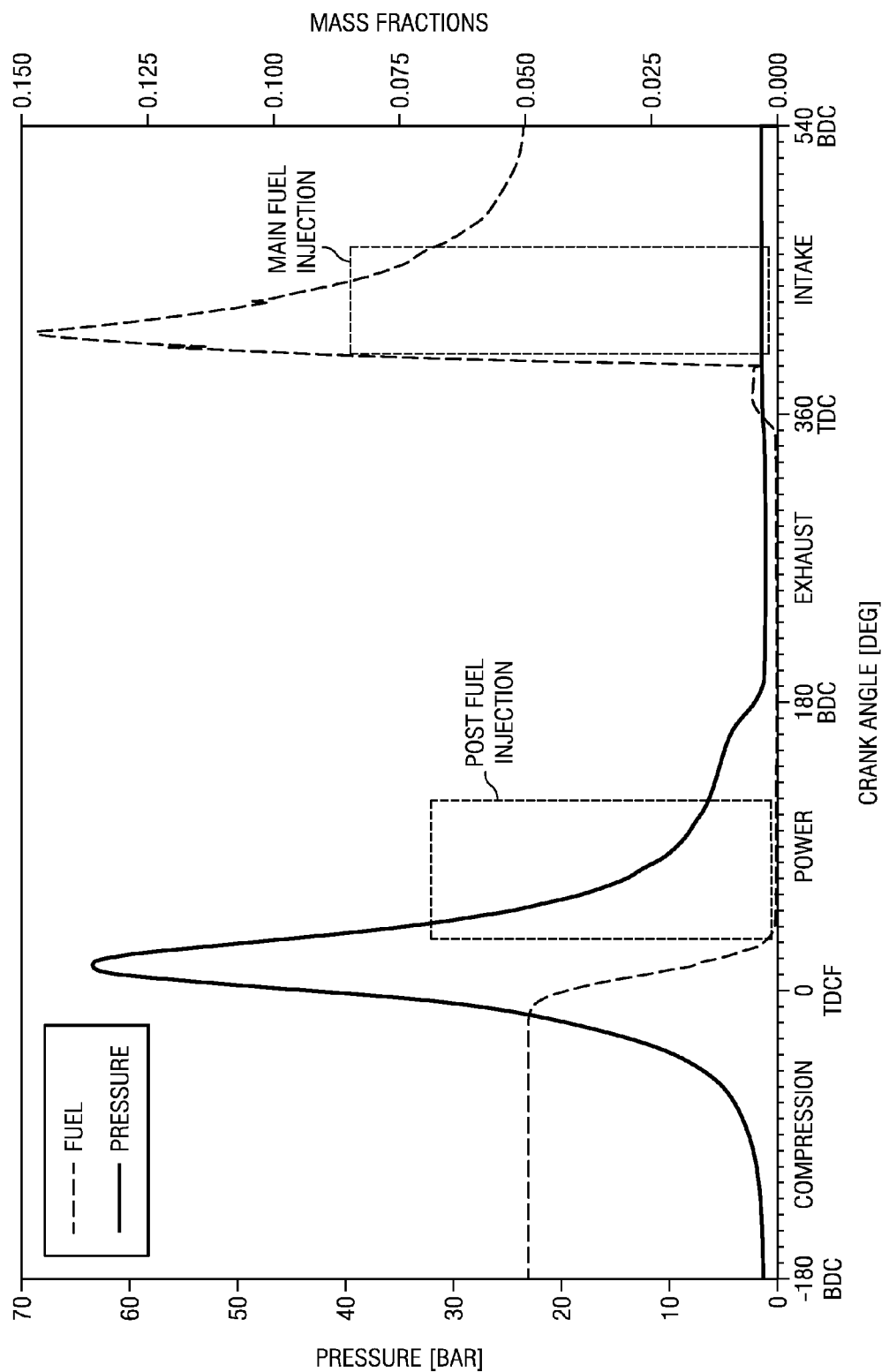
FIG. 4 illustrates engine cylinder pressure and the timing of the main and post fuel injection events.

FIG. 4 illustrates cylinder pressure (solid line) of the dedicated EGR cylinder as a function of crank angle. The timing (dotted lines) of the main and post injection events is also shown, as well as the fuel fraction (dashed line) in the combustion chamber resulting from the main fuel injection event. As illustrated, the main fuel injection occurs during the intake phase, whereas the post fuel injection occurs during the power phase between TDC and BDC (top dead center and bottom dead center of the piston motion).

Figure 5:
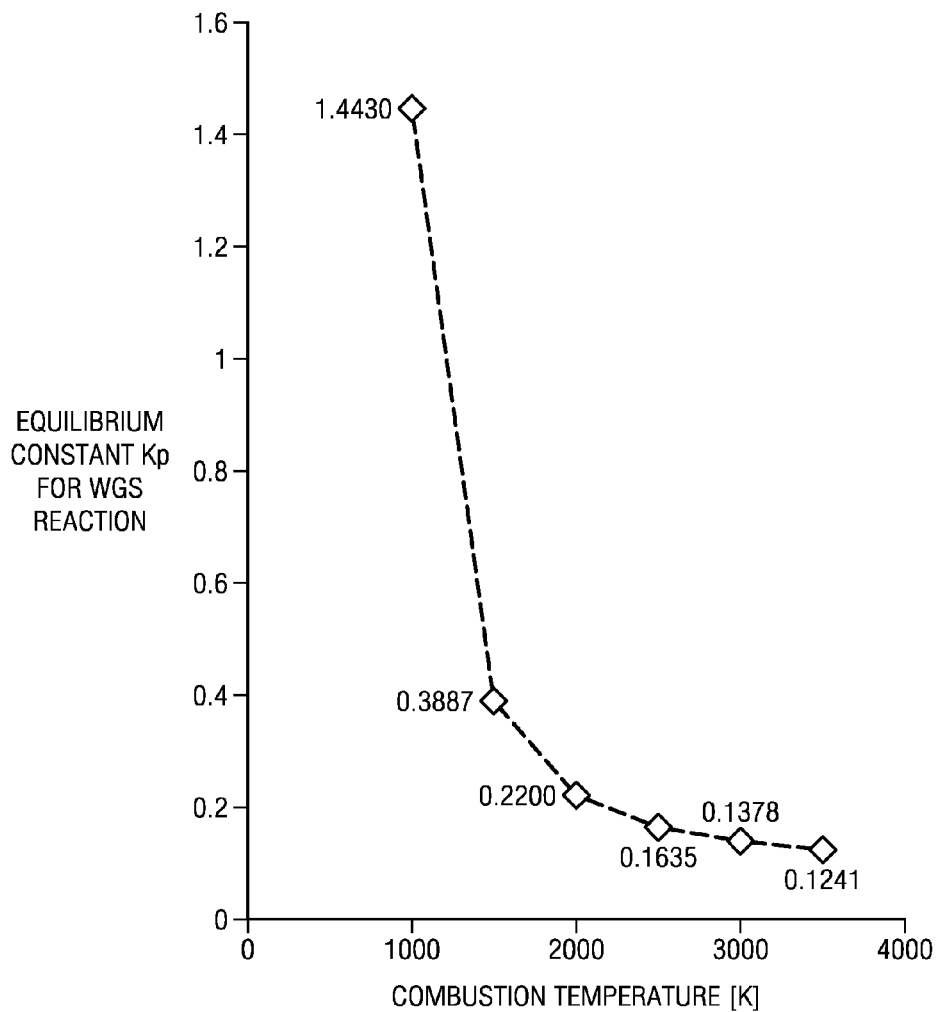
FIG. 5 illustrates the equilibrium constant for the WGS reaction of the catalyst as a function of combustion temperature.

FIG. 5 illustrates the equilibrium constant, Kp, for the WGS reaction as a function of combustion temperature. An additional benefit of the method is that the combustion chamber is cooled as a result of the post injection. The post injection cools because of fuel vaporization and partial reactions.

By cooling the charge temperature, the equilibrium constant for the gasses present is shifted toward $CO_2$ and $H_2$.

Figure 6:
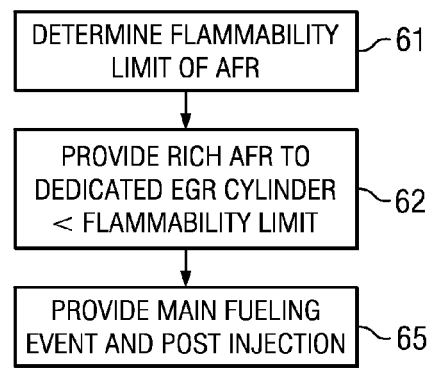
FIG. 6 illustrates a method of operating the dedicated EGR cylinder.

FIG. 6 illustrates an example of a method of operating the dedicated EGR cylinder 101*d*, which implements the above-described objectives. Step 61 is determining the flammability limit of the air-fuel ratio to be provided the cylinder 101*d*. This limit can be affected by, and therefore based on, current engine operating conditions, such as engine load, throttling, combustion temperature, etc.

Step 62 is providing the dedicated EGR cylinder with a rich air-fuel ratio that is less than the flammability limit. Step 65 is providing the rich air-fuel ratio, as determined in Step 62, to the dedicated EGR cylinder. As described above, fuel is provided for a main injection event as well as a post injection event, to maximize the H2 and CO content in the exhaust.

A further operation strategy is to use intake and exhaust cam phasing to optimize EGR quality and catalyst temperatures.

What is claimed is:

1. A method using exhaust gas recirculation (EGR) in a spark—ignited internal combustion engine having a number of cylinders, each cylinder operable to undergo a series of main combustion events when provided with fuel and air, comprising:
   using one or more of the cylinders as a dedicated EGR cylinder, such that all of the exhaust produced by that cylinder is recirculated to the cylinders;
   using the remaining cylinders as main cylinders, operable to provide power to an engine crankshaft;
   operating the main cylinders at a stoichiometric air-fuel ratio;
   operating the dedicated EGR cylinder at a rich air-fuel ratio; and
   using a fuel injector to inject fuel into the combustion chamber of the dedicated EGR cylinder after initiation of the main combustion events, thereby increasing the amounts of hydrogen (H2) and carbon monoxide (CO) in the exhaust gas of the dedicated EGR cylinder.

2. The method of claim 1, wherein the step of using a fuel injector is performed such that fuel is injected for so long as the temperature in the combustion chamber is high enough to promote a fuel reaction toward H2.

3. The method of claim 1, wherein the step of using a fuel injector is performed such that fuel is injected for so long as the temperature in the combustion chamber is high enough to promote a fuel reaction toward CO.

4. The method of claim 1, wherein the exhaust gas is recirculated via a recirculation loop, and further comprising providing a water-gas-shift catalyst on the recirculation loop.

5. The method of claim 4, further comprising determining, for the current engine operating conditions, a flammability threshold of the air-fuel ratio, and providing the dedicated EGR cylinder with a rich air-fuel ratio that maximizes the H2 exiting the WGS catalyst without exceeding the threshold.

6. The method of claim 1, wherein the engine is a fuel injection engine, and the injection step is performed with the same fuel injector as used for the main combustion events.

7. The method of claim 1, wherein the non dedicated EGR cylinders are operated at a stoichiometric air-fuel ratio, and further comprising using a three way catalyst to treat the engine exhaust.

8. The method of claim 1, wherein the non dedicated EGR cylinders are operated at a lean air-fuel ratio, and further comprising using a lean NOx trap, NOx adsorber, or selective reduction catalyst to treat the engine exhaust.

9. The method of claim 1, wherein the post injection is performed such that fuel is injected for so long as the temperature in the combustion chamber is high enough to promote a fuel reaction toward H2.

10. The method of claim 1, wherein post injection is performed such that fuel is injected for so long as the temperature in the combustion chamber is high enough to promote a fuel reaction toward CO.

11. The method of claim 1, wherein the post fuel injection occurs during the power phase of the engine between top dead center and bottom dead center of the piston.

12. The method of claim 1, further comprising determining a flammability limit of an air-fuel ratio to be provided to the dedicated EGR cylinder, and providing a rich air-fuel ratio to the dedicated EGR cylinder without exceeding the flammability limit.

* * * * *